(12) United States Patent
Hwang et al.

(10) Patent No.: US 10,499,342 B2
(45) Date of Patent: Dec. 3, 2019

(54) METHOD OF CONTROLLING TRANSMIT POWER OF UPLINK CHANNEL IN WIRELESS COMMUNICATION SYSTEM AND APPARATUS THEREFOR

(71) Applicant: LG ELECTRONICS INC., Seoul (KR)

(72) Inventors: Daesung Hwang, Seoul (KR); Suckchel Yang, Seoul (KR); Joonkui Ahn, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 211 days.

(21) Appl. No.: 15/642,001

(22) Filed: Jul. 5, 2017

(65) Prior Publication Data

US 2018/0014254 A1    Jan. 11, 2018

Related U.S. Application Data

(60) Provisional application No. 62/358,166, filed on Jul. 5, 2016.

(51) Int. Cl.
*H04W 52/14* (2009.01)
*H04W 72/04* (2009.01)
*H04W 52/32* (2009.01)
*H04W 52/24* (2009.01)
*H04W 88/02* (2009.01)

(52) U.S. Cl.
CPC ......... *H04W 52/146* (2013.01); *H04W 52/24* (2013.01); *H04W 52/325* (2013.01); *H04W 72/0473* (2013.01); *H04W 88/02* (2013.01)

(58) Field of Classification Search
CPC . H04W 52/146; H04W 52/24; H04W 52/325; H04W 72/0473; H04W 88/02
See application file for complete search history.

(56) References Cited

U.S. PATENT DOCUMENTS

| | | | |
|---|---|---|---|
| 2006/0092875 A1* | 5/2006 | Yang | H04W 52/42 370/329 |
| 2010/0113004 A1* | 5/2010 | Cave | H04W 52/365 455/422.1 |
| 2011/0228680 A1* | 9/2011 | Ball | H04W 52/346 370/241 |

(Continued)

FOREIGN PATENT DOCUMENTS

| | | | | |
|---|---|---|---|---|
| KR | 20130061586 A | * | 6/2013 | ............ H04B 7/024 |
| WO | WO-2017146773 A1 | * | 8/2017 | ............ H04W 52/40 |

*Primary Examiner* — Un C Cho
*Assistant Examiner* — Shah M Rahman
(74) *Attorney, Agent, or Firm* — Dentons US LLP

(57) ABSTRACT

A method for a user equipment to control transmit power of an uplink channel in a wireless communication system is disclosed in the present invention. The method includes the steps of setting a power control parameter to each of a plurality of power control processes, selecting a specific beam from among a plurality of beams, determining a specific power control process corresponding to the selected specific beam from among a plurality of the power control processes, adjusting transmit power of each of a plurality of symbols for the uplink channel according to a power control parameter set to the specific power control process, and transmitting the uplink channel to an eNB according to the adjusted transmit power.

10 Claims, 10 Drawing Sheets

(56) References Cited

U.S. PATENT DOCUMENTS

| | | | | |
|---|---|---|---|---|
| 2011/0319120 A1* | 12/2011 | Chen | .................... | H04W 52/367 |
| | | | | 455/522 |
| 2013/0114487 A1* | 5/2013 | Kim | .................... | H04W 72/042 |
| | | | | 370/311 |
| 2014/0105141 A1* | 4/2014 | Noh | ...................... | H04W 52/04 |
| | | | | 370/329 |
| 2014/0112220 A1* | 4/2014 | Kwak | ................... | H04B 7/0695 |
| | | | | 370/294 |
| 2014/0161003 A1* | 6/2014 | Han | .................... | H04W 52/146 |
| | | | | 370/280 |
| 2014/0315594 A1* | 10/2014 | Jeong | .................. | H04W 52/146 |
| | | | | 455/522 |
| 2015/0016376 A1* | 1/2015 | Seo | .................... | H04W 72/0406 |
| | | | | 370/329 |
| 2016/0165547 A1* | 6/2016 | Ouchi | .................. | H04W 52/146 |
| | | | | 455/522 |
| 2017/0289918 A1* | 10/2017 | Sun | ..................... | H04W 52/325 |
| 2017/0332359 A1* | 11/2017 | Tsai | ..................... | H04B 7/0617 |
| 2018/0041973 A1* | 2/2018 | Faxer | ................... | H04B 7/0617 |
| 2018/0124715 A1* | 5/2018 | Xu | ....................... | H04W 52/146 |
| 2019/0075526 A1* | 3/2019 | Nagaraj | ............... | H04B 7/0408 |

* cited by examiner

FIG. 2
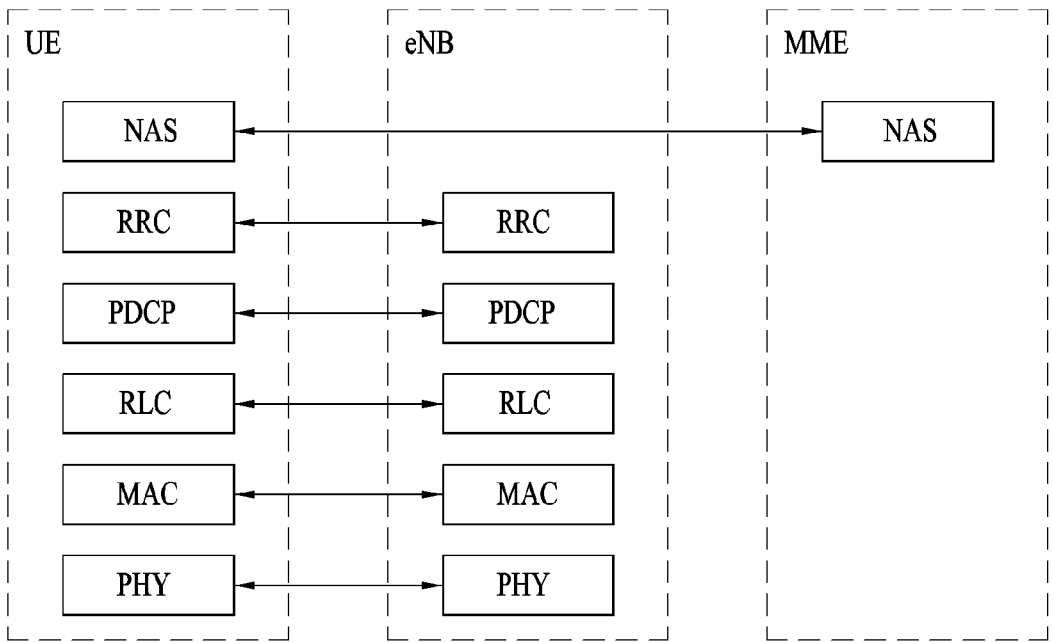
(A) CONTROL-PLANE PROTOCOL STACK
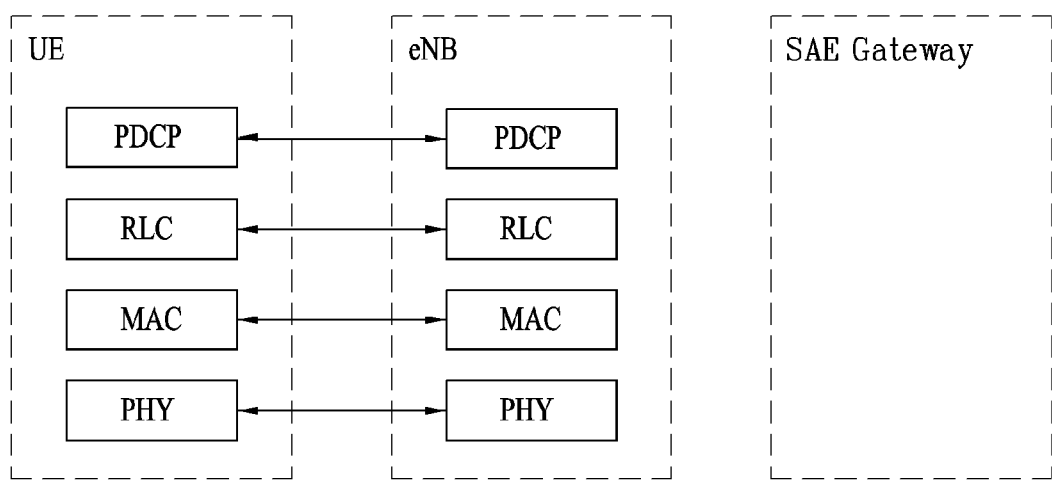
(B) USER-PLANE PROTOCOL STACK (A)  (B)

METHOD OF CONTROLLING TRANSMIT POWER OF UPLINK CHANNEL IN WIRELESS COMMUNICATION SYSTEM AND APPARATUS THEREFOR

This application claims the benefit of the U.S. Patent Application No. 62/358,166, filed on Jul. 5, 2016, which is hereby incorporated by reference as if fully set forth herein.

BACKGROUND OF THE INVENTION

Field of the Invention

The present invention relates to a method of controlling transmit power of an uplink channel in a wireless communication system and an apparatus therefor, and more particularly, to a method of efficiently transmitting an uplink channel by differently configuring transmit power according to a resource element of the uplink channel in accordance with a power control process and an apparatus therefor.

Discussion of the Related Art

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

SUMMARY OF THE INVENTION

Accordingly, the present invention is directed to an apparatus and method thereof that substantially obviate one or more problems due to limitations and disadvantages of the related art.

An object of the present invention is to provide a method of controlling transmit power of an uplink channel in a wireless communication system and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a method of controlling transmit power of an uplink channel, which is controlled by a user equipment (UE) in a wireless communication system, can include the steps of setting a power control parameter to each of a plurality of power control processes, selecting a specific beam from among a plurality of beams, determining a specific power control process corresponding to the selected specific beam from among a plurality of the power control processes, adjusting transmit power of each of a plurality of symbols for the uplink channel according to a power control parameter set to the specific power control process, and transmitting the uplink channel to an eNB according to the adjusted transmit power.

In this case, the method can further include the step of setting energy per resource element (EPRE) ratio corresponding to a ratio between EPRE of a first resource element for a data and EPRE of a second resource element for a reference signal included in the uplink channel to each of a plurality of the symbols for the uplink channel. The step of adjusting the transmit power of the uplink channel can include the steps of determining transmit power of the first resource element included in each symbol according to the power control parameter, and determining transmit power of the second resource element included in each symbol according to the EPRE ratio and the determined transmit power of the first resource element.

If EPRE ratio for a specific symbol is changed by power adjustment performed on the first resource element, a change of the EPRE ratio is determined as invalid and transmission of the uplink channel can be dropped. When a specific EPRE ratio is changed among EPRE ratios set to a plurality of the symbols, the specific EPRE ratio is changed one EPRE ratio of EPRE ratio candidates configured by downlink control information (DCI). The EPRE ratio is configured differently for each symbol according to a reference signal density of each of the plurality of symbols.

The transmit power of each of a plurality of the symbols can be adjusted using the same scaling coefficient.

To further achieve these objects and other advantages and in accordance with the purpose of the invention, as embodied and broadly described herein, according to a different embodiment, a user equipment (UE) transmitting an uplink channel in a wireless communication system can include a radio frequency (RF) unit configured to transceive a radio signal with an eNB, and a processor configured to set a power control parameter to each of a plurality of power control processes in a manner of being connected with the RF unit, the processor configured to select a specific beam from among a plurality of beams, the processor configured to determine a specific power control process corresponding to the selected specific beam from among a plurality of the power control processes, the processor configured to adjust transmit power of each of a plurality of symbols for the uplink channel according to a power control parameter corresponding to the specific power control process, the processor configured to transmit the uplink channel.

In this case, the processor can set energy per resource element (EPRE) ratio corresponding to a ratio between EPRE of a first resource element for a data and EPRE of a second resource element for a reference signal included in the uplink channel to each of a plurality of the symbols for the uplink channel. The processor can determine transmit power of the first resource element included in each symbol according to the power control parameter and determine transmit power of the second resource element included in each symbol according to the EPRE ratio and the determined transmit power of the first resource element.

If EPRE ratio for a specific symbol is changed by power adjustment performed on the first resource element, a change of the EPRE ratio is determined as invalid and transmission of the uplink channel can be dropped. When a specific EPRE ratio is changed among EPRE ratios set to a plurality of the symbols, the specific EPRE ratio is changed one EPRE ratio of EPRE ratio candidates configured by downlink control information (DCI). The EPRE ratio is configured differently for each symbol according to a reference signal density of each of the plurality of symbols.

The transmit power of each of a plurality of the symbols can be adjusted using the same scaling coefficient.

According to the present invention, it is able to efficiently perform uplink power control according to a pattern and distribution of a reference signal, or a power allocation difference between a reference signal and uplink data.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN);

DETAILED DESCRIPTION OF THE INVENTION

Figure 1:
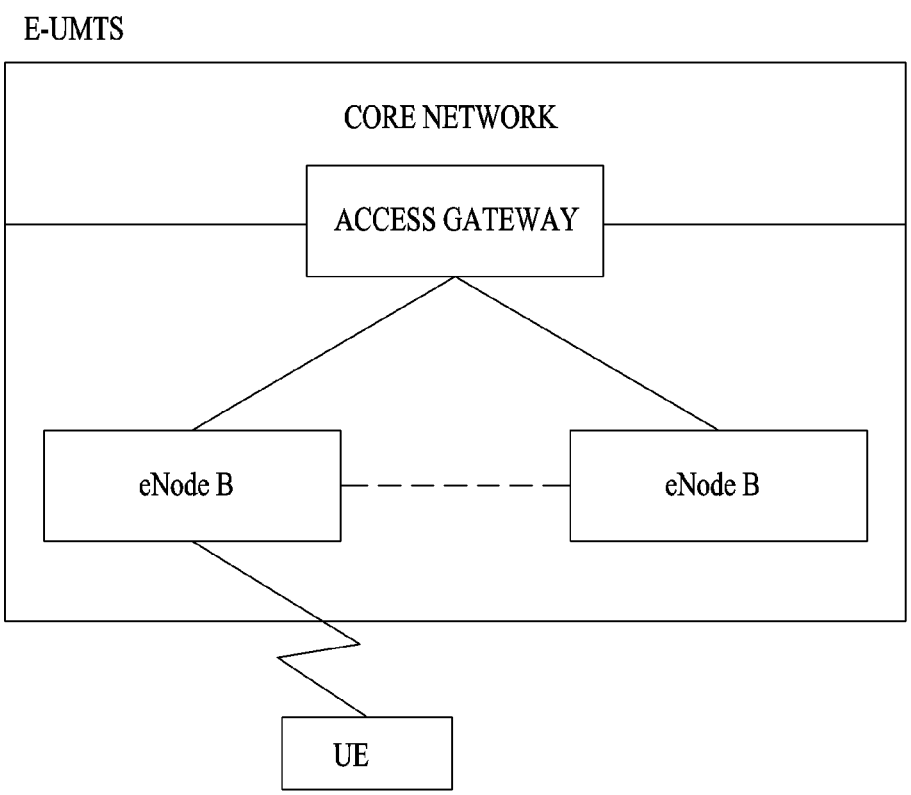
FIG. 1 illustrates a configuration of an Evolved Universal Mobile Telecommunications System (E-UMTS) network as an example of a wireless communication system.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd Generation Partnership Project (3GPP) system.

Although the embodiment of the present invention is described based on an LTE system and an LTE-A system in this specification, the LTE system and the LTE-A system are only exemplary and may be applied to all systems corresponding to the aforementioned definition.

The term 'Base Station (BS)' may be used to cover the meanings of terms including Remote Radio Head (RRH), evolved Node B (eNB or eNode B), Reception Point (RP), relay, etc.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
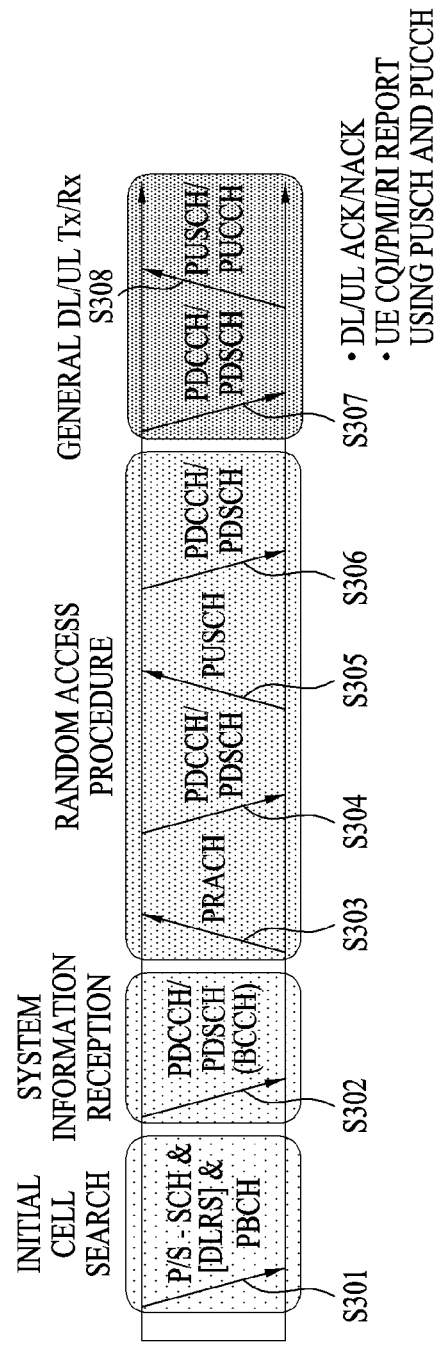
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
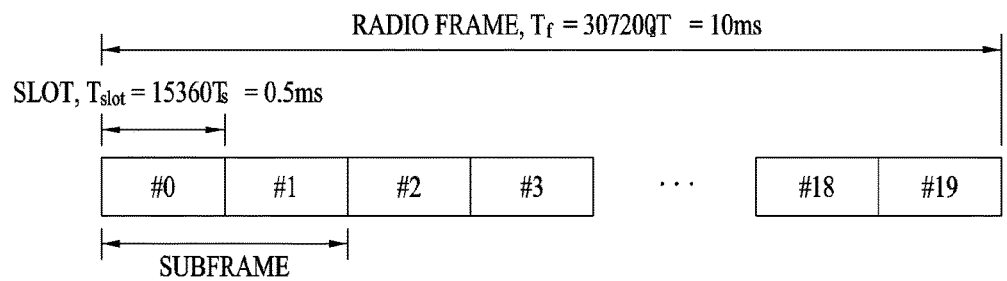
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms ($327200 \times T_s$) long and divided into 10 equal-sized subframes. Each subframe is 1 ms long and further divided into two slots. Each time slot is 0.5 ms ($15360 \times T_s$) long. Herein, $T_s$ represents a sampling time and $T_s=1/(15\ \text{kHz} \times 2048)=3.2552 \times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
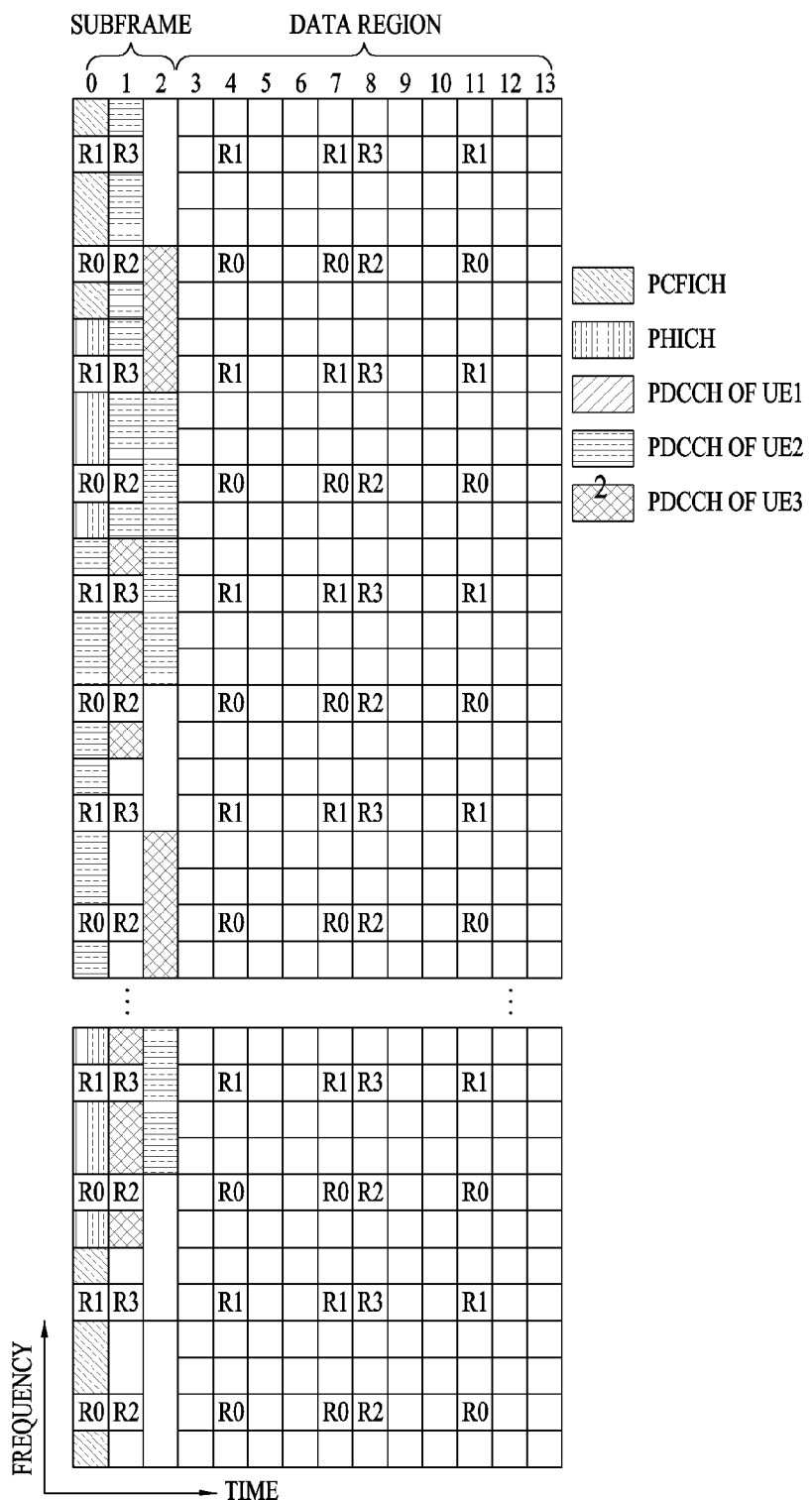
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
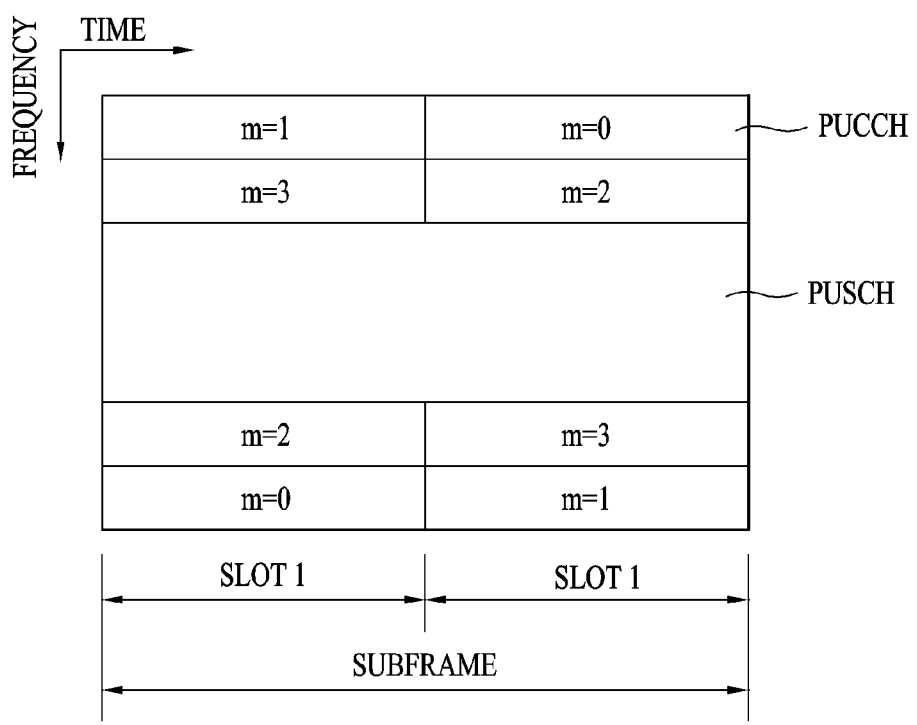
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Hereinafter, channel state information (CSI) reporting will be described below. In the current LTE standard, there are two MIMO transmission schemes, open-loop MIMO operating without channel information and closed-loop MIMO operating with channel information. Particularly in the closed-loop MIMO, each of an eNB and a UE may perform beamforming based on CSI to obtain the multiplexing gain of MIMO antennas. To acquire CSI from the UE, the eNB may command the UE to feedback CSI on a downlink signal by allocating a PUCCH (Physical Uplink Control CHannel) or a PUSCH (Physical Uplink Shared CHannel) to the UE.

The CSI is largely classified into three information types, RI (Rank Indicator), PMI (Precoding Matrix), and CQI (Channel Quality Indication). First of all, the RI indicates rank information of a channel as described above, and means the number of streams that may be received by a UE through the same time-frequency resources. Also, since the RI is determined by long-term fading of a channel, the RI may be fed back to an eNB in a longer period than a PMI value and a CQI value.

Second, the PMI is a value obtained by reflecting spatial characteristics of a channel, and indicates a precoding matrix index of an eNB, which is preferred by the UE based on a metric such as signal to interference and noise ratio (SINR). Finally, the CQI is a value indicating channel strength, and generally means a reception SINR that may be obtained by the eNB when the PMI is used.

In the 3GPP LTE-A system, the eNB may configure a plurality of CSI processes for the UE, and may be reported CSI for each of the CSI processes. In this case, the CSI process includes CSI-RS resource for specifying signal quality and CSI-IM (interference measurement) resource, that is, IMR (interference measurement resource) for interference measurement.

Since a wavelength becomes short in the field of Millimeter Wave (mmW), a plurality of antenna elements may be installed in the same area. In more detail, a wavelength is 1 cm in a band of 30 GHz, and a total of 64(8×8) antenna elements of a 2D array may be installed in a panel of 4 by 4 cm at an interval of 0.5 lambda(wavelength). Therefore, a recent trend in the field of mmW attempts to increase coverage or throughput by enhancing BF (beamforming) gain using a plurality of antenna elements.

In this case, if a transceiver unit (TXRU) is provided to control a transmission power and phase per antenna element, independent beamforming may be performed for each frequency resource. However, a problem occurs in that effectiveness is deteriorated in view of cost when TXRU is provided for all of 100 antenna elements. Therefore, a scheme is considered, in which a plurality of antenna elements are mapped into one TXRU and a beam direction is controlled by an analog phase shifter. Since this analog beamforming scheme may make only one beam direction in a full band, a problem occurs in that frequency selective beamforming is not available.

As an intermediate type of digital BF and analog BF, a hybrid BF having B TXRUs smaller than Q antenna elements may be considered. In this case, although there is a difference depending on a connection scheme of B TXRUs and Q antenna elements, the number of beam directions that enable simultaneous transmission is limited to B or less.

Figure 7:
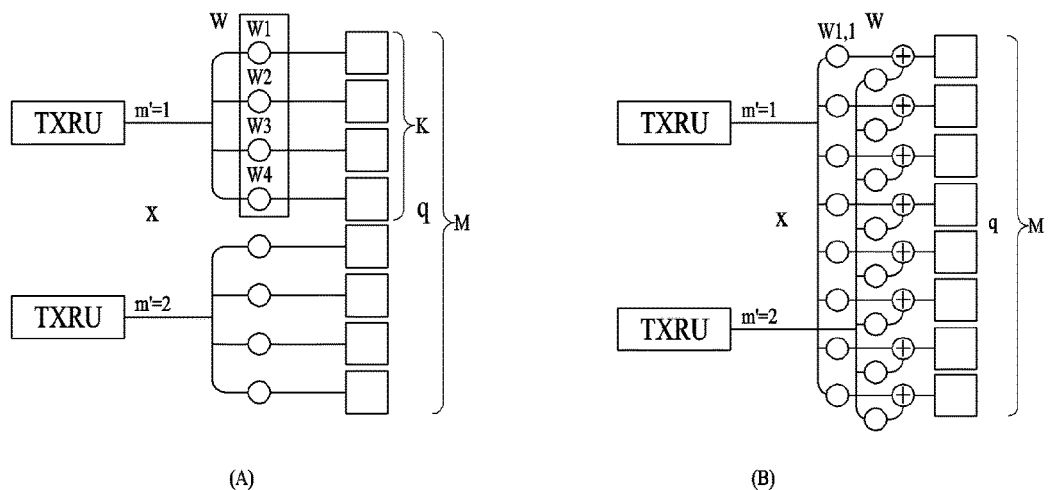
FIG. 7 illustrates examples of a connection scheme between TXRUs and antenna elements.

FIG. 7 illustrates examples of a connection scheme between TXRUs and antenna elements.

(a) of FIG. 7 illustrates that TXRU is connected to a sub-array. In this case, the antenna elements are connected to only one TXRU. Unlike (a) of FIG. 7, (b) of FIG. 7 illustrates that TXRU is connected to all antenna elements. In this case, the antenna elements are connected to all TXRUs. In FIG. 7, W indicates a phase vector multiplied by an analog phase shifter. That is, a direction of analog beamforming is determined by W. In this case, mapping between CSI-RS antenna ports and TXRUs may be 1-to-1 or 1-to-many.

As more communication devices require greater communication capacity, the need of mobile broadband communication more advanced than the conventional RAT (radio access technology) has been issued. Also, massive MTC (Machine Type Communications) technology that provides various services anywhere and at any time by connecting a plurality of devices and things is one of main issues which will be considered in next generation communication. Furthermore, a communication system design considering service/UE susceptible to reliability and latency has been discussed. Considering this status, the introduction of the next generation RAT has been discussed, and the next generation RAT will be referred to as NewRAT in the present invention.

Figure 8:
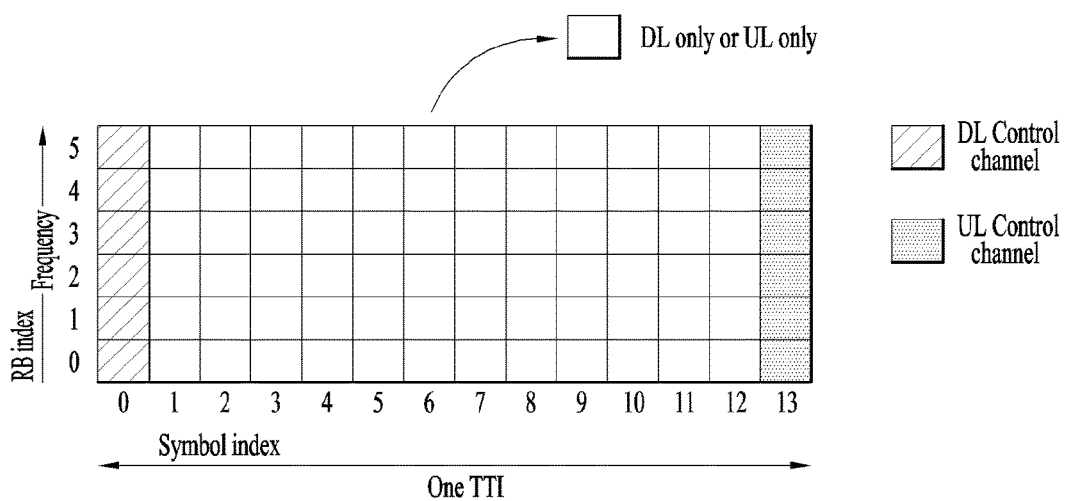
FIG. 8 illustrates an example of a self-contained subframe structure.

A self-contained subframe structure shown in FIG. 8 is considered in the fifth generation NewRAT to minimize data transmission latency in a TDD system. FIG. 8 illustrates an example of a self-contained subframe structure.

In FIG. 8, oblique line areas indicate downlink control regions and black colored areas indicate uplink control regions. Areas having no mark may be used for downlink data transmission or uplink data transmission. In this structure, downlink transmission and uplink transmission are performed in due order within one subframe, whereby downlink data may be transmitted and uplink ACK/NACK may be received within the subframe. As a result, the time required for data re-transmission may be reduced when an error occurs in data transmission, whereby latency of final data transfer may be minimized.

In this self-contained subframe structure, a time gap for switching from a transmission mode to a reception mode or vice versa is required for the eNB and the UE. To this end, some OFDM symbols (OS) at the time when a downlink is switched to an uplink in the self-contained subframe structure are set to a guard period.

Examples of the self-contained subframe type that may be configured in the system operating based on the NewRAT may consider four subframe types as follows.

downlink control period+downlink data period+GP+uplink control period
downlink control period+downlink data period
downlink control period+GP+uplink data period+uplink control period
downlink control period+GP+uplink data period Meanwhile, the status that sharp beamforming (for example, analog beamforming) for DL/UL is introduced using a plurality of antennas may be considered in the fifth generation NewRAT. In this case, it may be assumed that sharp beamforming is varied depending on time.

For example, it may be general that a beam direction at SF#n (that is, subframe #n) and a beam direction at SF#m (that is, subframe #m) are different from each other. It may be assumed that signals transmitted and received between different beam directions are little affected by signal attenuation. In this case, if an uplink signal is transmitted, UEs suitable for a beam direction A may appropriately transmit signals at a timing point corresponding to the beam direction A. In this case, the expression "suitable for a beam direction A" may mean that transmission efficiency is high in the corresponding direction, the probability of receiving or detecting a signal is high in view of the eNB, or reception strength of the signal is high.

Therefore, if the UEs suitable for the beam direction A transmit signals at a timing point corresponding to a beam direction B, the eNB cannot receive or detect the signal transmitted from the corresponding UE, or reception power strength of the signal may be reduced to a specific level or less.

Meanwhile, in $5^{th}$ New RAT, PARR (peak to average power ratio) requirement in uplink transmission can be mitigated. Hence, it may consider performing frequency division multiplexing (FDM) on data and a reference signal (RS) in the same symbol.

And, in relation to channel estimation and data decoding, it may be able to introduce a technology for configuring RS overhead or RS density or such a technology as RS power boosting. In particular, in case of the RS power boosting, EPRE (energy per resource element) for transmitting a DMRS (de-modulation reference signal) may differ from EPRE for transmitting data when uplink transmission is performed.

In order to compensate for phase noise, discussion on the introduction of a PCRS (phase-noise compensation reference signal) is in progress. In this case, an RS including a PCRS and a DMRS can be transmitted over a plurality of symbols. And, TDM (time division multiplexing) and/or FDM (frequency division multiplexing) can be performed on a reference signal for a plurality of UEs. Similar to this, TDM (time division multiplexing) and/or FDM (frequency division multiplexing) can be performed on a reference signal for a plurality of antenna ports.

For example, If MU-MIMO (multi-user, multiple input multiple output) is considered or a PCRS is transmitted to a specific antenna port only to guarantee PCRS transmission transmitted from a plurality of antenna ports from inter-layer interference, PCRS for the remaining antenna ports can be reserved without being used for data mapping.

As mentioned in the foregoing description, when density for a reference signal such as a DMRS and/or a PCRS is different between symbols or symbol groups, or a power difference between a resource element to be used for transmitting a reference signal and a resource element to be used for transmitting data is permitted, the present invention proposes a method of configuring transmit power of a physical uplink channel Meanwhile, although embodiments for a method of configuring uplink transmit power are explained in the present invention, it is apparent that the idea of the present invention can also be extensively applied to a case of configuring downlink transmit power.

The expressions used in the embodiments of the present invention are not restricted to LTE or New RAT system. It is apparent that the idea of the present invention can also be extensively applied to a different RAT or a physical channel which is referred to as a different name. In addition, an assumption for an analog beam is not restricted to a singular case or a plural case at specific timing.

<Method of Configuring Ratio Between RS Power and Data Power>

In $5^{th}$ generation New RAT, a DMRS can be transmitted from a specific symbol. In particular, if FDM (frequency division multiplexing) is performed on a DMRS and a data in the same symbol, it may be necessary to define a transmit power configuration between a specific data resource element and a different data resource element. On the contrary, although FDM between a data and a reference signal is not permitted, an optimized EPRE (energy per resource element) ratio between a DMRS and a data may vary according to an operating SINR (signal to interference plus noise ratio) for an uplink channel, a coder ate, MCS (modulation and coding scheme), or RA (random access).

For example, in case of a PCRS, if TDM is performed on a reference signal for a plurality of UEs in transmitting xPUCCH/xPUSCH, when a specific UE transmits xPUCCH/xPUSCH, a PCRS position for a different UE is reserved and puncturing or rate-matching can be performed on the PCRS position instead of performing data mapping at the PCRS position for the different UE.

As a different example, when TDM is performed on a reference signal for a plurality of antenna ports and the sum of transmit power for transmitting a plurality of the antenna ports is consistent, if reference signal transmission is performed on a specific antenna port, it may not use a position of a reference signal for a different antenna port (i.e., a resource element of the reference signal for the different antenna port) in consideration of a MU-MIMO operation or inter-layer interference and it may be able to perform puncturing or rate-matching on the position of the reference signal for the different antenna port instead of performing data mapping at the position.

Hence, it may be preferable to configure a reference signal ERPRE and a data EPRE according to a specific ratio in the $5^{th}$ generation New RAT. For example, it may be able to differently configure reference signal density according to a symbol or a symbol group. In particular, when a data is transmitted in a manner of being FDM with a reference signal, EPRE ratio between the reference signal and the data can be differently configured according to a symbol or a symbol group in accordance with a ratio difference between transmit power used by the data and transmit power used by the reference signal.

Figure 9:
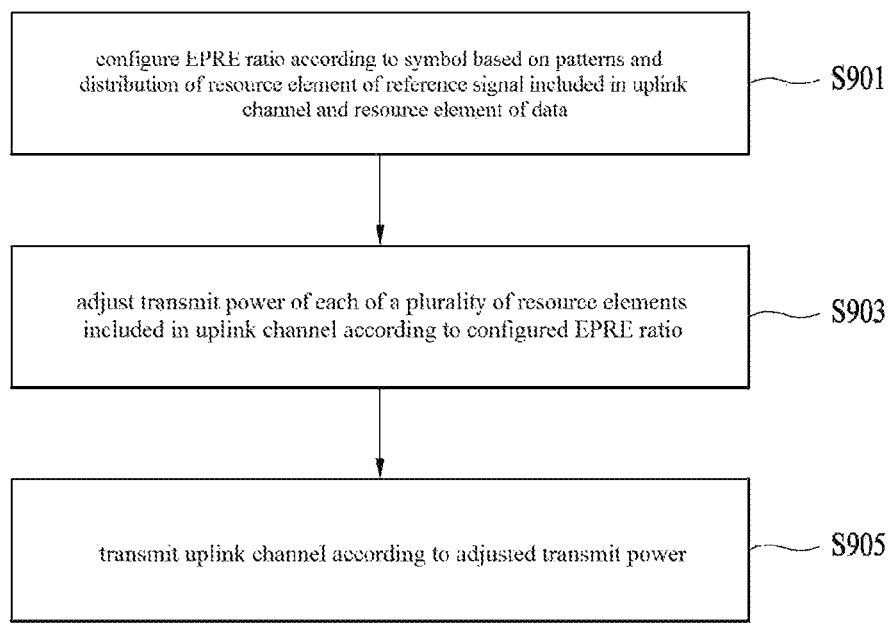
FIG. 9 is a flowchart for explaining a method of configuring an EPRE (Energy Per Resource Element) ratio according to embodiments of the present invention.

Referring to FIG. 9, EPRE ratio is configured according to a symbol or a symbol group based on patterns and distribution of a resource element of a reference signal included in an uplink channel and a resource element of a data [S901]. Subsequently, transmit power of each of a plurality of resource elements included in the uplink channel is adjusted according to the configured EPRE ratio [S903] and the uplink channel is transmitted according to the adjusted transmit power [S905].

More specifically, assume that a specific symbol includes 4 DMRS resource elements, a different specific symbol includes no DMRS resource element, and DMRS boosting is performed. In this case, a data resource element transmit power of the specific symbol can be configured to be smaller than a data resource element transmit power of the different specific symbol.

In the following, embodiments for a method of configuring EPRE ratio between a reference signal and a data in the $5^{th}$ generation New RAT are explained. In the embodiments described in the following, a reference signal may correspond to either a DMRS or a PCRS. In this case, a resource element transmit power of the DMRS and a resource element transmit power of the PCRS may be the same. Or, it may be able to configure a third specific ratio. In this case, the third specific ratio can be determined by following or applying the method of configuring the EPRE ratio between a reference signal and a data. In particular, the method of configuring the EPRE ratio between a reference signal and a data can be extensively applied to a method of configuring a ratio between transmit power of a DMRS resource element and transmit power of a PCRS resource element.

Moreover, similar to the method of configuring the EPRE ratio between data according to a symbol or a symbol group, the embodiments described in the following can be extensively applied to a method of configuring EPRE ratio between resource elements to which signals having a different characteristic are mapped.

1. Embodiment 1

EPRE ratio between a reference signal and a data can be fixed in advance. In particular, the EPRE ratio between the reference signal and the data can be configured in a manner of being fixed by X dB. More specifically, a data EPRE between symbol groups can be always fixed by X dB. For example, the X may correspond to 0 dB. Transmit power of a data resource element may be the same irrespective of a symbol or a symbol group. Meanwhile, the EPRE ratio between the reference signal and the data can be separately configured according to a symbol or a symbol group.

For example, the EPRE ratio can be configured by X dB in a symbol in which a DMRS is included. The EPRE ratio can be configured by Y dB in a symbol in which a DMRS is not included. More specifically, the EPRE ratio can be configured in consideration of a plurality of symbol groups according to a DMRS/PCRS configuration. In particular, a relation between Y dB and X dB can be configured using a parameter such as the number of resource elements of a reference signal and the number of resource elements of a data.

2. Embodiment 2

EPRE ratio between a reference signal and a data can be configured via higher layer signaling. In this case, the EPRE ratio can be configured in a single form without distinguishing symbol groups from each other. In particular, EPRE ratio configuration can be always consistent between symbol groups.

On the contrary, in order to differentiate a data EPRE according to a symbol group, it may be able to independently configure EPRE ratio according to a symbol group. For example, Rho_A and Rho_B can be set to a first symbol group and a second symbol group, respectively, as EPRE ratio between a reference signal and a data. Specifically, while EPRE ratio per symbol group is UE-specifically configured, a relation between EPRE ratios, which are configured according to a symbol group, can be cell-specifically configured. In this case, the relation between the EPRE ratios can also be configured in a ratio form.

And, it may be able to configure EPRE ratio in consideration of a plurality of symbol groups according to a DMRS/PCRS configuration. For example, the EPRE ratio can be configured in a manner of being divided into a data EPRE in a symbol in which a DMRS is transmitted, a data EPRE in a symbol in which a PCRS is transmitted, and a data EPRE in a symbol in which both a DMRS and a PCRS are not transmitted.

3. Embodiment 3

EPRE ratio between a reference signal and a data can be dynamically configured. For example, the EPRE ratio can be configured by DCI or a combination of a high layer offset and a DCI indication value. A value configured by the DCI can be configured in advance or a candidate value can be configured by higher layer.

EPRE ratio for xPUSCH, similar to a UL grant included in an RAR (random access response), can be configured via an indication value of DCI corresponding to the UL grant.

EPRE ratio for xPUCCH can be configured via an indication value of DCI corresponding to DL assignment.

For example, when an eNB transmits DCI to a UE based on a previous uplink channel received from the UE, the eNB can transmit the DCI to the UE in a manner of including the EPRE ratio in the DCI.

When the EPRE ratio is configured, it may be able to directly configure the EPRE ratio in a manner of indicating an indication value included in the DCI in a form of an absolute value or it may be able to configure an accumulation value based on a previously transmitted indication value. More specifically, as a method of avoiding ambiguity between a UE and an eNB, EPRE ratio configuration via DCI can be restricted to a form of directly configuring an absolute value.

In addition, the EPRE ratio value configuration using DCI can be configured by a single configuration for xPUSCH/xPUCCH irrespective of a symbol group. Meanwhile, in order to differentiate a data EPRE according to a symbol group, it may be able to configure an EPRE ratio using a different process according to a symbol group. For example, it may be able to separately configure an indication field per symbol group. Or, an indication field can indicate a set of parameter values related to a plurality of EPRE ratios for each symbol group in consideration of DCI overhead.

In the aforementioned embodiments, the EPRE ratio between the reference signal and the data may separately exist according to a type of a reference signal. In this case, the EPRE ratio can be semi-statically configured according to the type of the reference signal, can be configured via higher layer signaling, or can be dynamically configured via an indication value.

<Method of Configuring Reference Signal Transmit Power and Data Transmit Power>

Uplink transmit power can be changed according to an offset value configured via higher layer signaling at an eNB side, a downlink measurement-based pathloss compensation value, an amount of data to be transmitted via xPUCCH/xPUSCH, a coding rate, or the like. And, $5^{th}$ generation New RAT considers changing a power control process according to information on a plurality of beams.

For example, when a plurality of preferable beam information exist in a UE side, it may consider a method of separately configuring higher layer signaling or data interworking offsets in accordance with each of a plurality of the beam information. And, when pluralities of sets are configured via high layer, it may be able to indicate a power control process to be used by a UE via DCI. In addition, if a UE selects second best beam information due to a change of best beam information at the uplink transmission timing or load balancing, the UE can change the power control process.

Specifically, in case of xPUCCH, a coefficient value of a power offset, which varies according to a UCI size, can be independently configured according to a beam selection or a power control process. In this case, the coefficient value can be configured via higher layer signaling.

And, a slope of a BLER (block error rate) curve for UCI may vary according to a beam type. Hence, it is necessary to differently configure a power offset value, which is interlocked with a UCI size, according to a power control process. Similarly, in case of xPUSCH, when a power offset is interlocked with a transport block size (TBS), a coefficient value interlocked with the TBS can be independently configured according to a power control process. In this case, the power control process value can be configured via higher layer signaling.

Figure 10:
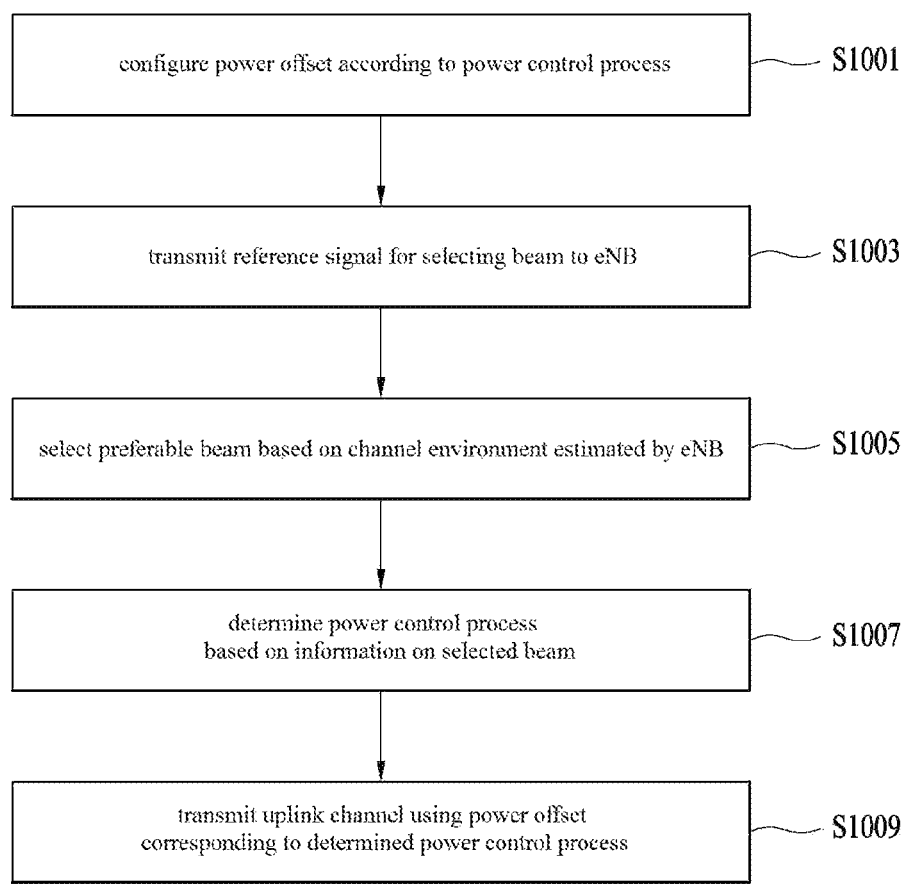
FIG. 10 is a flowchart for explaining a method of configuring transmit power according to embodiments of the present invention.

Regarding this, it may briefly refer to FIG. 10. A UE configures a power offset according to a power control process [S1001] and transmits a reference signal for selecting a beam to an eNB [S1003]. In this case, the reference signal may correspond to an SRS (sounding reference signal). Subsequently, the UE selects a beam preferred by the UE based on channel environment for uplink transmission which is estimated by the eNB based on the reference signal [S1005]. Subsequently, a power control process is determined based on information on the selected beam [S1007] and it may be able to transmit an uplink channel using a power offset corresponding to the determined power control process [S1009].

Meanwhile, if EPRE for a data is identical to EPRE for a reference signal, uplink transmit power induced via a power control process can be evenly divided according to a resource allocated to the data and a resource allocated to the reference signal. On the contrary, if the EPRE configuration for the data is different from the EPRE configuration for the reference signal, it is necessary to define a method of practically applying uplink transmit power induced via a power control process. In this case, the uplink transmit power may correspond to a power value, which is configured by configuring transmit power per carrier or maximum transmit power for the entire uplink transmission as an upper limit. The configured power can be applied to each symbol. In this case, power control can be performed in a manner that the entire configured power is distributed to the reference signal EPRE and the data EPRE according to the EPRE ratio between the reference signal and the data in each symbol.

As a different method, it may be able to perform a power control process to induce a value of the reference signal EPRE or the data EPRE. In this case, EPRE, which is not a target of a power control process, can be determined according to a predetermined EPRE ratio. In particular, if the data EPRE is calculated by a power control process, the reference signal EPRE can be determined according to the predetermined EPRE ratio.

In this case, power scaling for maximum transmit power per carrier or power scaling for maximum transmit power of entire uplink transmission can be performed after EPRE is configured. Meanwhile, if there is no limit on the maximum transmit power, EPRE, which is configured according to a power control process and EPRE ratio, can be allocated to a resource element of a reference signal and a resource element of a data, respectively. For example, a reference signal EPRE can be calculated and obtained via EPRE ratio between the reference signal and the data after data EPRE corresponding to a target of a power control process is calculated via the power control process. On the contrary, if the reference signal EPRE corresponds to a target of the power control process, the data EPRE can be calculated via the EPRE ratio between the reference signal and the data after the reference signal EPRE is calculated.

Subsequently, it may be able to perform power scaling according to the entire power in a manner of combining the reference signal and the data according to each symbol. In the following, embodiments for a method of performing power scaling according to the entire power are explained.

1. Embodiment 1

The maximum transmit power per carrier or the maximum transmit power of the entire uplink is assumed as an upper limit for each symbol of an uplink channel and power scaling is uniformly performed on a data resource element. If EPRE ratio between a data and a reference signal is changed for a specific symbol or a symbol group, it may be able to regulate that the change of the EPRE ratio is invalid and it may be able to drop uplink channel transmission. Yet, if the uplink channel transmission is performed using a scheme rather than a QAM modulation scheme, it may be able to perform the uplink channel transmission without drop.

Meanwhile, in the condition of matching the EPRE ratio between the data and the reference signal with the upper limit, the EPRE ratio can be changed into a specific EPRE ratio. Specifically, the EPRE ratio can be selected from among a DCI indication and candidates capable of being configured by higher layer.

2. Embodiment 2

The maximum transmit power per carrier of a symbol group having the maximum power among a plurality of symbol groups or the maximum transmit power of the entire uplink is assumed as an upper limit and it may be then able to uniformly perform power scaling on a data resource element and a reference signal resource element. In particular, the power scaling is performed on a different symbol group using the same scaling factor. In this case, EPRE ratio between a data and a reference signal can be maintained according to each symbol group and it may be able to use a QAM modulation scheme.

3. Embodiment 3

In order to match the maximum transmit power per carrier or the maximum transmit power of the entire uplink to an upper limit, it may be able to preferentially perform power scaling on one of data EPRE and reference signal EPRE.

For example, in order to prevent a QAM modulation scheme failure due to the ambiguity of EPRE ratio, in the condition of matching the EPRE ratio between the data and the reference signal with the upper limit, the EPRE ratio can be changed into a specific EPRE ratio.

Specifically, the EPRE ratio can be selected from among a DCI indication and candidates capable of being configured by higher layer.

Figure 11:
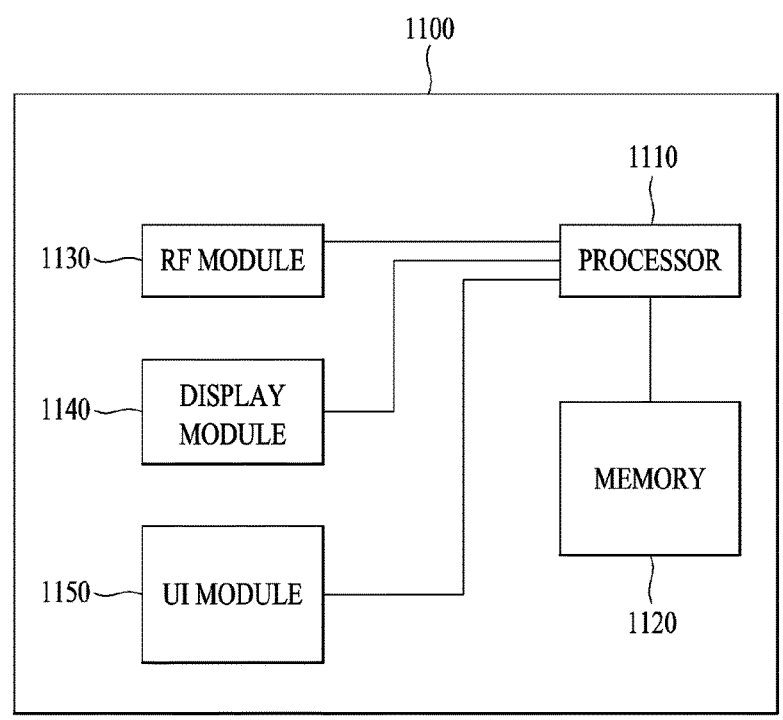
FIG. 11 is a block diagram of a communication apparatus according to an embodiment of the present disclosure.

FIG. 11 is a block diagram of a communication apparatus according to an embodiment of the present disclosure.

Referring to FIG. 11, a communication apparatus 1100 includes a processor 1110, a memory 1120, an RF module 1130, a display module 1140, and a User Interface (UI) module 1150.

The communication device 1100 is shown as having the configuration illustrated in FIG. 11, for the convenience of description. Some modules may be added to or omitted from the communication apparatus 1100. In addition, a module of the communication apparatus 1100 may be divided into more modules. The processor 1110 is configured to perform operations according to the embodiments of the present disclosure described before with reference to the drawings. Specifically, for detailed operations of the processor 1910, the descriptions of FIGS. 1 to 10 may be referred to.

The memory 1120 is connected to the processor 1110 and stores an Operating System (OS), applications, program codes, data, etc. The RF module 1130, which is connected to the processor 1110, upconverts a baseband signal to an RF signal or downconverts an RF signal to a baseband signal. For this purpose, the RF module 1130 performs digital-to-analog conversion, amplification, filtering, and frequency upconversion or performs these processes reversely. The display module 1140 is connected to the processor 1110 and displays various types of information. The display module 1140 may be configured as, not limited to, a known component such as a Liquid Crystal Display (LCD), a Light Emitting Diode (LED) display, and an Organic Light Emitting Diode (OLED) display. The UI module 1150 is connected to the processor 1110 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Although the method for transmitting uplink control information in a wireless communication system and the apparatus for the same have been described based on the 3GPP LTE system, the method and the apparatus may be applied to various wireless communication systems in addition to the 3GPP LTE system.

INDUSTRIAL APPLICABILITY

Although a method of controlling transmit power of an uplink channel in a wireless communication system and an apparatus therefor have been explained centering on the examples applied to 3GPP LTE system, the method and the apparatus can also be applied to various wireless communication systems as well as the 3GPP LTE system.

What is claimed is:

1. A method of transmitting an uplink channel, by a user equipment (UE) in a wireless communication system, the method comprising:
configuring a plurality of power control parameters to each of a plurality of power control processes;
configuring energy per resource element (EPRE) ratio for each of a plurality of the symbols for the uplink channel,
wherein the EPRE ratio is a ratio between EPRE of a first resource element for a data and EPRE of a second resource element for a reference signal included in the uplink channel;
determining a specific power control process related to a specific beam among the plurality of the power control processes;
determining a first transmit power of the first resource element included in each symbol based on the power control parameter configured to the specific power control process;
determining a second transmit power of the second resource element included in each symbol based on the EPRE ratio and the first transmit power of the first resource element; and
transmitting, to a base station, the uplink channel based on the first and second transmit powers.

2. The method of claim 1, wherein if EPRE ratio for a specific symbol is changed by power adjustment performed on the first resource element, a change of the EPRE ratio is determined as invalid and transmission of the uplink channel is dropped.

3. The method of claim 1, wherein when a specific EPRE ratio is changed among EPRE ratios set to a plurality of the symbols, the specific EPRE ratio is changed to one EPRE ratio of EPRE ratio candidates configured by downlink control information (DCI).

4. The method of claim 1, wherein the EPRE ratio is configured differently for each symbol according to a reference signal density of each of the plurality of symbols.

5. The method of claim 1, wherein the first and second transmit powers of each of a plurality of the symbols is adjusted based on the same scaling coefficient.

6. A user equipment (UE) for transmitting an uplink channel in a wireless communication system, the UE comprising:
a transmitter and a receiver; and
a processor operatively coupled to the transmitter and the receiver, wherein the processor is configured to:
configure a plurality of power control parameters to each of a plurality of power control processes;
configure energy per resource element (EPRE) ratio for each of a plurality of the symbols for the uplink channel,
wherein the EPRE ratio is a ratio between EPRE of a first resource element for a data and EPRE of a second resource element for a reference signal included in the uplink channel;
determine a specific power control process related to a specific beam among the plurality of the power control processes;
determine a first transmit power of the first resource element included in each symbol based on the power control parameter configured to the specific power control process;
determine a second transmit power of the second resource element included in each symbol based on the EPRE ratio and the first transmit power of the first resource element; and
transmit the uplink channel based on the first and second transmit powers.

7. The UE of claim 6, wherein if EPRE ratio for a specific symbol is changed by power adjustment performed on the first resource element, a change of the EPRE ratio is determined as invalid and transmission of the uplink channel is dropped.

8. The UE of claim 6, wherein when a specific EPRE ratio is changed among EPRE ratios set to a plurality of the symbols, the specific EPRE ratio is changed to one EPRE ratio of EPRE ratio candidates configured by downlink control information (DCI).

9. The UE of claim 6, wherein the EPRE ratio is configured differently for each symbol according to a reference signal density of each of the plurality of symbols.

10. The UE of claim 6, wherein the first and second transmit powers of each of a plurality of the symbols is adjusted based on the same scaling coefficient.

* * * * *